United States Patent [19]

Vermeer

[11] 4,203,275
[45] May 20, 1980

[54] TRACTOR MOUNTED HARVESTER UNIT

[76] Inventor: Gary J. Vermeer, Box 200, Pella, Iowa 50219

[21] Appl. No.: 931,192

[22] Filed: Aug. 4, 1978

[51] Int. Cl.² ............................................ A01D 45/02
[52] U.S. Cl. ..................................... 56/15.8; 56/15.6; 56/15.9; 56/208
[58] Field of Search ................................ 56/15.7–15.9, 56/15.6, 208, 218, 228

[56] References Cited

U.S. PATENT DOCUMENTS

| | | | |
|---|---|---|---|
| Re. 21,542 | 8/1940 | Oehler et al. | 56/15.9 |
| 1,945,119 | 1/1934 | Metcalf | 56/15.9 |
| 2,836,022 | 5/1958 | Caldwell | 56/15.6 |
| 3,183,650 | 5/1965 | Ferris | 56/15.9 |
| 3,320,730 | 5/1967 | Barhstrom et al. | 56/15.6 |
| 3,822,534 | 7/1974 | Martin | 56/15.8 |
| 3,834,142 | 9/1974 | Johnston et al. | 56/15.9 |

FOREIGN PATENT DOCUMENTS 1457946  4/1969  Fed. Rep. of Germany ............ 56/15.9

Primary Examiner—Jay N. Eskovitz
Attorney, Agent, or Firm—Rudolph L. Lowell; G. Brian Pingel

[57] ABSTRACT

A tractor mounted corn harvesting unit has ground engaging steerable wheels, side frame members pivotally connected to the tractor, and a hydraulic cylinder connected between the tractor and the harvesting unit for adjusting the unit weight carried by the ground engaging wheels. The side frame members movably support the rear end of the harvesting unit on the tractor for up and down movement of the front end thereof, and the hydraulic cylinder operates to raise and lower the harvesting unit between an elevated position therefor, wherein the ground engaging wheels provide substantially no ground support for the front end of the harvesting unit, and a lowered position therefor wherein the wheels provide at least a partial ground support for the harvesting unit.

3 Claims, 9 Drawing Figures

TRACTOR MOUNTED HARVESTER UNIT

BACKGROUND OF THE INVENTION

1. Field of the Invention

The present invention relates in general to tractor mounted harvesting units and, more specifically, to mounting assemblies for securing and supporting a corn harvesting unit from a tractor.

2. Description of the Prior Art

Various types of mounting assemblies have been employed in the past for supporting corn harvesting units from tractors as exemplified by the mounting assembly disclosed in U.S. Pat. No. Re. 21,542 issued to Oehler, et al., Jan. 10, 1936. Oehler, et al. discloses a tractor mounted two row corn picker which has ground engaging support wheels that at all times carry a major part of the picker weight. The corn picker is pivotally attached at its rear end to the tractor and the front end is manually vertically adjustable with respect thereto. Steering control of the corn picker wheels is provided by a linkage connection between the picker wheels such that the steerable wheels of the corn picker move in unison with the steering wheels of the tractor.

The Oehler, et al. device has many desirable features of operation, but is of a complicated structure so as to involve considerable labor and time in mounting it on a tractor. Moreover, the mounting assembly does not permit the corn picker to be fully—or even substantially—supported by the tractor even though under certain conditions of terrain, it would be highly desirable to do so.

SUMMARY OF THE INVENTION

The present invention provides a tractor mounting assembly for the rear end portion of a corn harvesting unit on a tractor so that the front portion of the harvesting unit can be carried by the tractor, or supported in whole or in part by steerable ground engaging wheels on the harvesting unit. Adjustment of the weight supported position of the harvesting unit relative to the tractor is accomplished in conformance with field conditions encountered during a harvesting operation.

When operating in muddy fields, the harvesting unit can be adjusted for support on the ground engaging wheels so as to reduce the weight carried by the tractor front wheels, and thereby facilitate steering and decreasing the risk of the tractor wheels becoming mired in the field. Under dry field conditions the harvesting unit can be moved to a raised position for partial support on the tractor. In a raised or elevated position, the front end of the harvesting unit is yieldably supported on the tractor front end for isolating the corn picker from terrain jarring forces to which the tractor may be subjected.

The mounting assembly includes side frame members that provide a pivotal support of the harvesting unit to the tractor vehicle, and a manually actuated hydraulic means for raising and lowering the unit. Pivot connections for pivotally connecting the frame members and the hydraulic means to the tractor vehicle provide for a ready connection or disconnection of the harvesting unit and tractor.

DESCRIPTION OF THE PREFERRED EMBODIMENT

Figure 1:
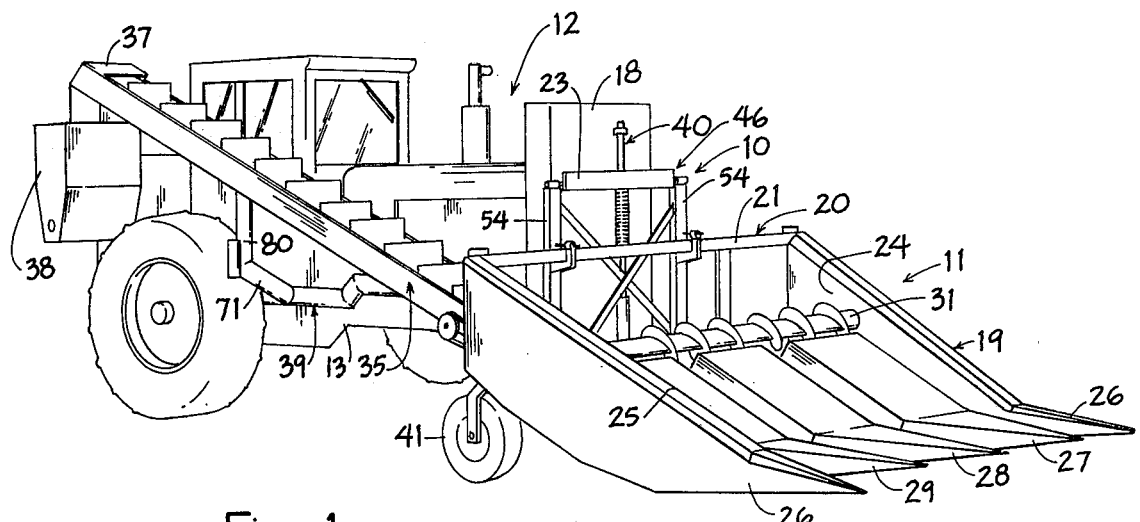
FIG. 1 is a perspective view of the tractor mounted corn harvester unit of the present invention shown in assembly relation with a tractor vehicle.

The present invention provides a support assembly, shown generally at 10 in FIG. 1, for mounting a corn harvesting unit 11 from the front portion of a standard type tractor vehicle 12 having a main frame 13, a front pair of steerable wheels 14 (FIG. 2) and a rear pair of drive wheels 15 are mounted on wheel axles 16 and 17, respectively. An air directing shield 18 prevents debris from entering the tractor engine compartment.

Figure 2:
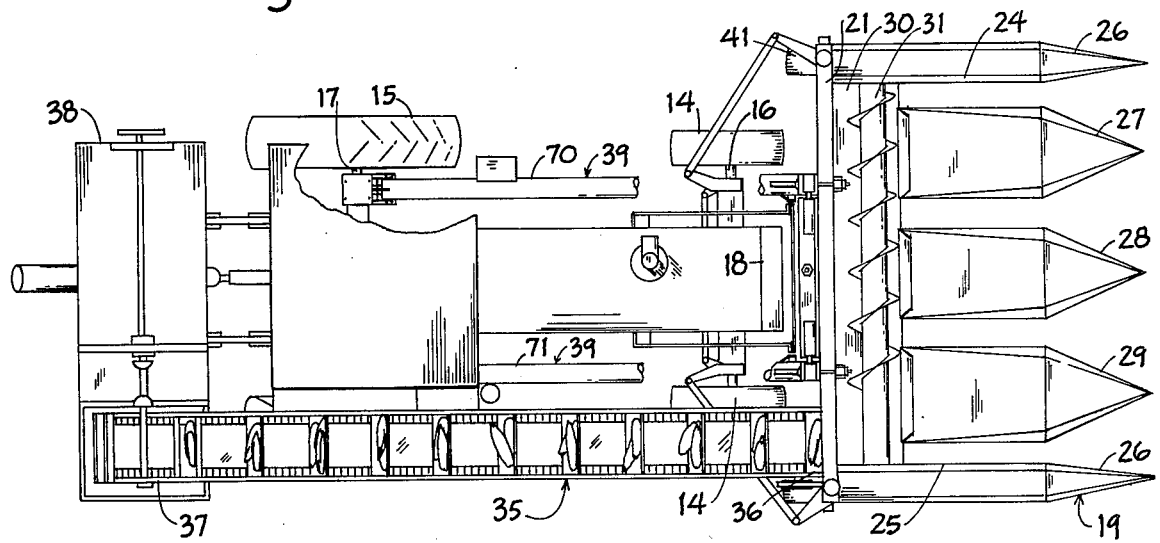
FIG. 2 is a plan view of the assembly shown in FIG. 1.

The corn harvesting unit 11 is of the general construction described in U.S. Pat. No. 3,589,110, incorporated by reference herein. Included in the harvesting unit 11 is a corn head 19 having an upright rear support structure 20 with vertically spaced apart upper and lower transverse cross beams 21 and 22 (FIG. 5), respectively. Referring to FIGS. 1 and 2, spaced apart side walls 24 and 25 extend forwardly from the support structure 20 and terminate in forwardly extended gatherers 26.

The harvesting unit 11 illustrated is of a four row type; consequently, there are three additional gatherers 27, 28, and 29 between the gatherers 26. The gatherers 27–29 are supported from the lower cross beam 22, and a panel 30 (FIG. 2 only) disposed between the lower support beam 22 and the rear portions of the gatherers 27–29 serves as a floor for the harvesting unit 11. An auger 31 is rotatably mounted at its ends in the side walls 24 and 25, and is connected to a drive means (not shown) for rotatably driving the auger 31 to convey ears of corn collected by the gatherers 26–29 to an elevator 35 adjacent the corn head side wall 25.

The elevator 35 has a front end 36 connected to the harvesting unit rear support structure 20 and extends rearwardly and upwardly to terminate in a rear end 37 that preferably is disposed above the hopper of a corn sheller or husker 38. The support structure 20 is open to the elevator 35 to permit passage of the ears of corn directed by the auger 31 into the elevator 35 for delivery thereby to the corn sheller 38.

The aforementioned components of the harvesting unit 11 are all old in the art. The present invention is directed to the support assembly 10 that includes side frame members 39 for pivotally securing the unit 11 to the tractor vehicle 12, and power means 40 for raising and lowering the unit 11 with respect to the vehicle 12 to vary the distribution of the weight of the unit 11 between the vehicle 12 and a pair of ground engaging support wheels 41 rotatably mounted from the unit 11. Thus, under wet terrain operating conditions, the corn head 19 can be lowered, so as to be primarily supported by the wheels 41 to reduce the weight carried by the wheels of the tractor vehicle 12. In contrast, under dry terrain operating conditions, the corn head 19 can be completely supported by the vehicle 12.

Figure 4:
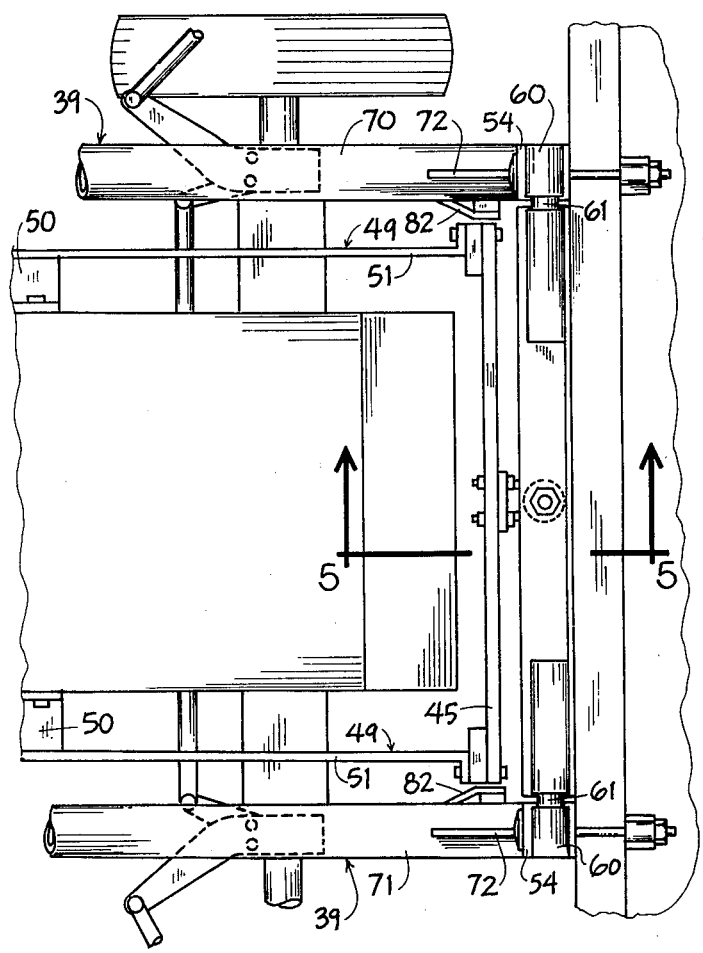
FIG. 4 is an enlarged fragmentary plan view showing the mounting assembly for the front portion of the harvester unit with the front end of the tractor vehicle.

The power means 40 (FIG. 5) is preferably a double acting hydraulic cylinder unit 42 having a piston rod 43 and a cylinder 44. The cylinder unit 42 may be driven by the hydraulic fluid system of the tractor vehicle 12 and is extended in an upright position between a mounting bracket 45 supported from the tractor vehicle body 13 and a support frame 46 fixed to the corn head cross beams 21 and 22. Referring to FIG. 4, the mounting bracket 45 is supported forward of the lower front portion of the tractor vehicle 12 by a pair of support brackets 49 each having a base portion 50 bolted to one side of the tractor body 13, and a forwardly extended arm portion 51 that is bolted to one side of the mounting bracket 45 to form a rigid support therefor.

A clevis connector 52 (FIG. 5) is centrally fixed to the mounting bracket 45 for connection to the lower end of the cylinder 44. The outer end of the piston rod 43 is slidably disposed through an angle iron 53 that serves as a top member for the support frame 46. Also forming the support frame 46 are two upright spaced apart parallel side beam members 54 that are welded at their bottom ends to the harvesting unit lower cross beam 22. Each side beam member 54 also has a bracket member 55 that cradles the upper cross beam member 21, and a bolt and nut assembly 56 is engaged between each of the bracket members 55 and associated side beam member 54 to fix the side beam members 54 to the cross arm 21.

Welded to the upper ends of the side beam members 54 are axially aligned journal members 60 (FIG. 4). Stub shafts 61 are fixed to the end portions of the top member 53 for disposition in the journal members 60 so as that the top member 53 is rotatable with respect to the side members 54. An abutment plate 65 (FIG. 5) is clamped in a fixed relation about the piston rod 43 above the cylinder 44, and a stiff coil spring 66 is mounted about the piston rod 43 between the abutment member 65 and the top frame member 53. Thus, the spring 66 provides a yieldable support for the harvesting unit 11 in all vertically moved positions of the piston rod 43.

Figure 6:
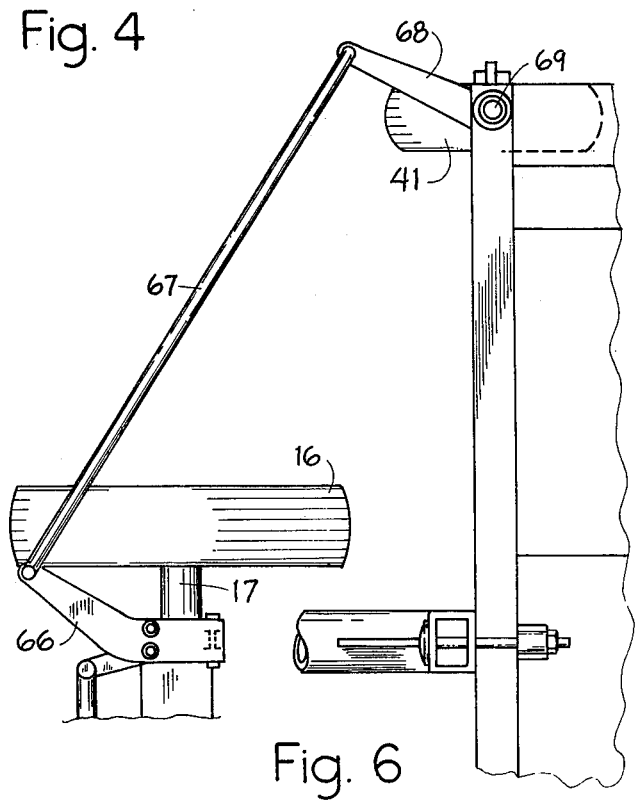
FIG. 6 is a fragmentary plan view showing the linkage connection between the steering wheels of the tractor vehicle and the steerable ground engaging wheels of the harvesting unit of FIG. 1.

Extension of the piston rod 43 raises the harvesting unit 11 to result in a shifting of the weight of the unit 11 from the ground engaging wheels 41 to the tractor vehicle 12, and can be sustained until the entire unit 11 is supported by the vehicle 12. Correspondingly, the piston rod 43 can be retracted until a major portion of the unit 11 is supported by the wheels 41. To provide steering control of the wheels 41, bell crank members 66 (FIG. 6) are clamped onto the front axles 16 of the vehicle 12 and are interconnected by links 67 with levers 68 tied to vertical axles 69 of the wheels 41. As a result, the wheels 41 move in unison with movement of the front wheels 14 of the vehicle 12.

Figure 5:
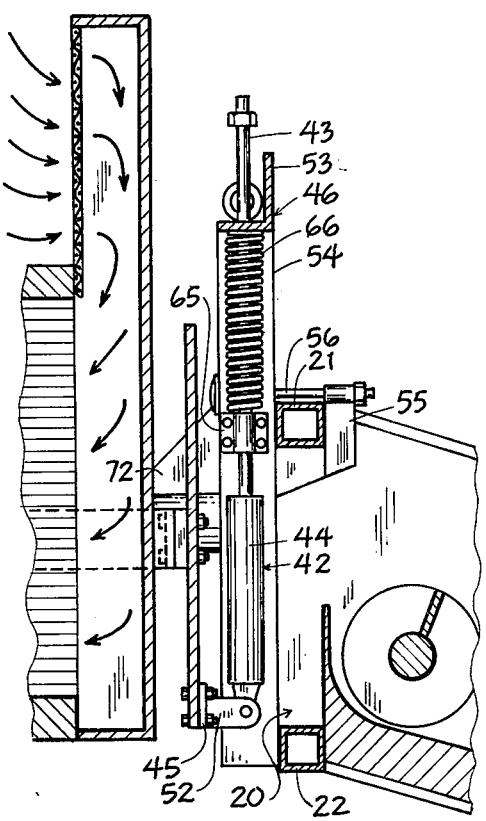
FIG. 5 is a sectional view taken on line 5—5 of FIG. 4.

The side frame members 39 of the assembly 10 are formed of tubular connecting members 70 and 71 that are extended on each side of the tractor body 13 between the corn head 19 and the rear axle 17 of the tractor vehicle 12 for holding the corn head 19 in a position normal to the longitudinal axis of the vehicle 12. As indicated by FIGS. 4 and 5, the connecting members 70 and 71 are fixed, as by welding, at their front ends to the support frame side members 54, and gusset plates 72 are employed for strengthening the connections therebetween.

Figure 7:
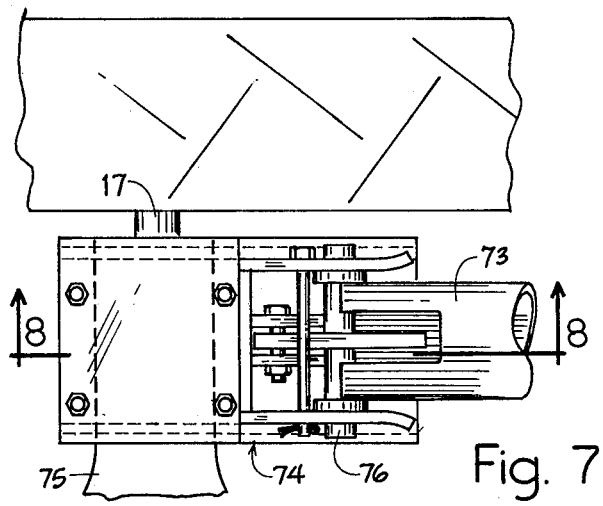
FIG. 7 is an enlarged detail plan view showing the assembly of the rear portion of the harvester unit with the tractor vehicle.
Figure 8:
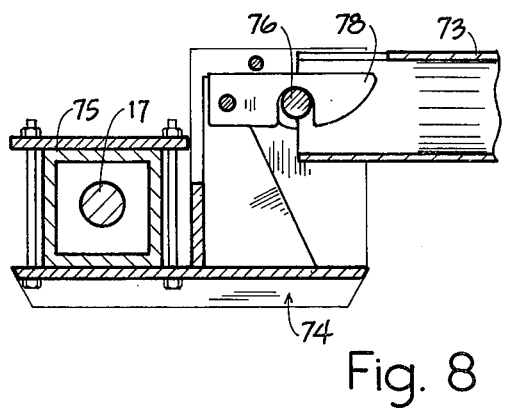
FIG. 8 is a sectional view taken on line 8—8 of FIG. 7.
Figure 9:
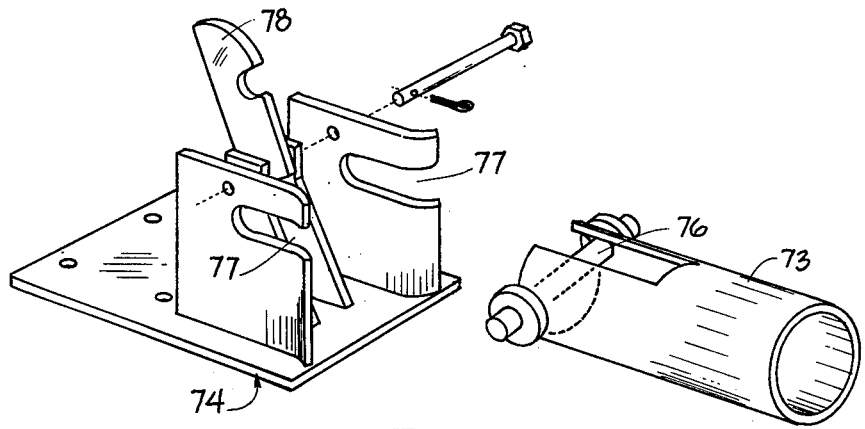
FIG. 9 is an exploded perspective view of the connecting members forming the assembly, shown in FIG. 7.

The rear ends of the connecting members 70 and 71 each terminate in a pivot connection 74 (FIGS. 7-9) adapted for pivotally coupling with a latch assembly 74 clamped on side housings 75 for the rear axle 17. The connections 73 have pins 76 that are receivable in slots 77 in the latch assemblies 74, and pivotal latches 78 of the assemblies 74 are engageable with the pins 76 for releasably securing the pins 76 in the slots 77. Thus, the pivot connections 73 and the latch assemblies 74 provide quick fit connections for pivotally supporting the rear end of the harvesting unit 11 to the tractor vehicle 12.

Figure 3:
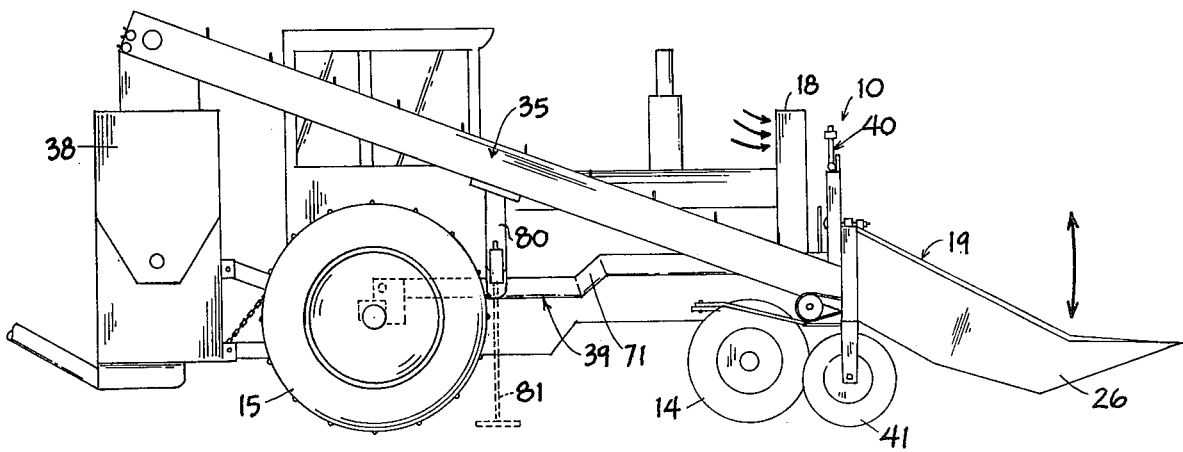
FIG. 3 is a side view of the assembly shown in FIG. 1.

To aid in supporting the elevator 35, an upright tubular connecting member 80 is extended between and welded to the connecting member 71 and the housing of the elevator 35 as shown in FIGS. 1 and 3. Consequently, the elevator 35 has no direct connections with the tractor vehicle 12, but is entirely supported from the corn head 19 and the stabilizer member 71. Accordingly, attachment or removal of the harvesting unit 11 from the tractor vehicle 12 involves only three connections between the support assembly 10 and the tractor vehicle 12, which are the clevis connector 52 to the hydraulic cylinder 44, and the connecting members 70 and 71 to the latch assemblies 74. Yet, each of these connections is made simply by means of a pin coupling to reduce to a minimum the time and labor required in attaching or removing the harvesting unit 11. When the harvesting unit 11 is removed from the tractor vehicle 12, support feet 81 (FIG. 3) are employed to maintain the unit 11 in a tractor mounted position. Thus, to install the unit 11 on the vehicle 12 all that is necessary is to drive the vehicle 12 into a proper mounting position with the unit 11 and then making the above connections. To facilitate driving the tractor into a proper mounting position, guide members 82 are mounted on the front ends of the side frame members 39 to guide the tractor front end into a proper position with the unit 11 for mounting.

Although the invention has been described with respect to a preferred embodiment thereof, it is to be understood that it is not to be so limited since changes and modifications can be made therein which are within the full intended scope of this invention as defined by the appended claims.

I claim:

1. A tractor mounted corn harvester unit mountable on a tractor vehicle and having a rear portion, opposite side frame members, and ground engaging wheel means, said harvester unit including means for mounting said unit on said tractor, said mounting means comprising:

(a) means for mounting said unit on the tractor including means for pivotally connecting the opposite side frame members of said harvester unit to said tractor vehicle;

(b) a support member rigidly mounted on the lower front portion of said tractor vehicle, and
(c) an upright hydraulic power means connected between said support member and the upper rear portion of said harvester unit for vertically raising and lowering said unit between a raised position therefor wherein said ground engaging wheel means provide substantially no support for said harvester unit, and a lowered position therefor wherein said wheel means provide at least partial support for said harvester unit, said power means having:
  (1) a hydraulic cylinder having a closed end secured to one of said support member or said harvester unit, and a piston rod; and
  (2) spring means mounted about said piston rod for engagement with the other of said support member or said harvester unit to provide a resilient support for said harvester unit at all moved positions therefor.

2. A tractor mounted corn harvester unit according to claim 1, wherein said tractor vehicle has a pair of rear wheels mounted on a rear axle protruding from axle housings on each side of the vehicle, and said pivotally connecting means includes:
  (a) a pivot connection on each of said side frame members; and
  (b) a latch assembly for each of said pivot connections mounted from said axle housings for coacting with said pivot connection to pivotally secure said harvester unit to said vehicle.

3. A tractor mounted corn harvester unit according to claim 1 wherein said harvester unit includes a transversely extended rotatable support bar in engagement with said power means.

* * * * *